Figure 1:
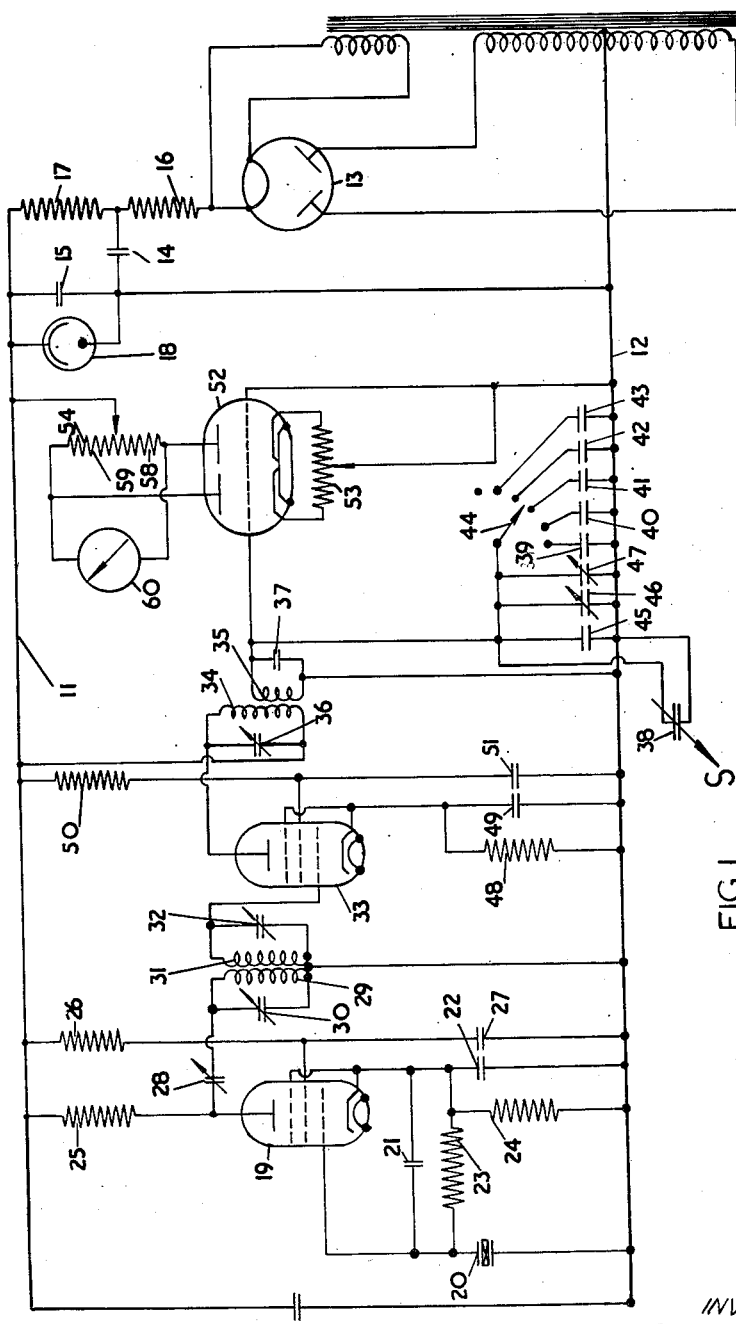

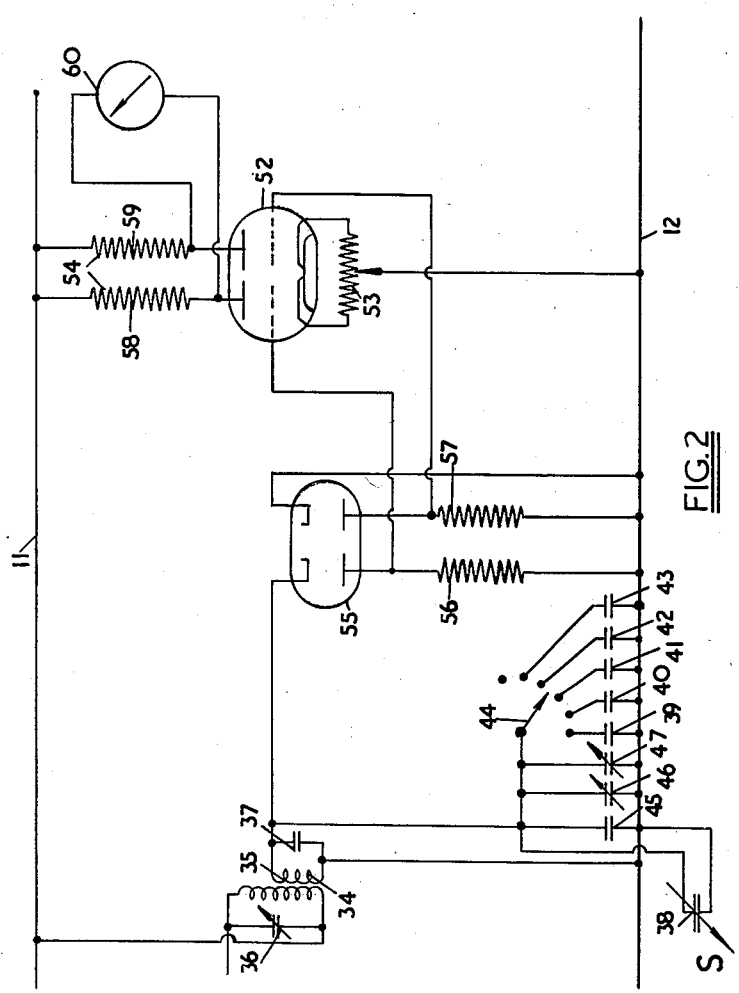

Patented Mar. 11, 1952

2,588,702

UNITED STATES PATENT OFFICE 2,588,702

MEASURING INSTRUMENT RESPONSIVE TO CAPACITY VARIATIONS

James Richard Cornelius, Coventry, England

Application April 14, 1950, Serial No. 156,026
In Great Britain May 31, 1949

3 Claims. (Cl. 175—183)

The invention relates to an instrument, for measuring a fine dimension, of the kind in which a movement of a stylus, in direct relation to the dimension to be measured, varies the capacitance of a capacitor in an electronic oscillator circuit for varying the frequency thereof, and in which the variable frequency is imposed on a fixed frequency of the circuit for setting up a beat frequency from which latter the dimension can be indicated or recorded. Such an instrument forms the subject of my British Patent No. 577,538.

There are various instruments of this kind in use at present but they all share the disadvantage that it is not possible to observe or indicate, with a desirable degree of accuracy for a long period (e. g., several thousand hours), small dimensions (by which term I intend also to include small variations in dimensions) of the order of one-millionth of an inch. This defect has been due either to the inductances and capacitors, included in the measuring circuit of the instrument, not having sufficiently low temperature coefficients, or to them not being arranged for their said coefficients to be combined in such a manner as to satisfactorily eliminate overall variations induced by temperature changes.

My object is to improve an instrument of the kind referred to by eliminating (or at least mitigating) the overall variations due to temperature changes so as to enable the instrument to measure accurately, for a long period, dimensions of the order of one-millionth part of an inch.

According to the invention, the measuring circuit includes an oscillator valve, the output at the anode of which is of constant frequency, regulated by a quartz-crystal and combined with a tank circuit for filtering out a selected harmonic, and an amplifying circuit to which the selected harmonic is fed and which includes a voltage amplifier with a temperature-compensating filter, the latter comprising a primary section of small inductance and large capacitance, and a secondary section of smaller inductance and larger capacitance as compared with the primary section, the inductances and capacitors of the two sections respectively being arranged for any variations due to temperature changes to be opposed, and the secondary section including the variable capacitor which is influenced by the stylus.

By the term "stylus" I intend to include any suitable element for engaging a surface of which a dimension is to be measured, with reference to a datum, and which is operatively associated with the movable plate of the variable capacitor for feeding the dimension into the measuring circuit.

In the accompanying drawings:

Figure 1 shows one form of measuring circuit for an instrument according to the invention; and Figure 2 is an alternative output circuit.

Similar parts in the two figures are denoted by like reference numerals.

Referring first to Figure 1, the circuit is connected at 11, 12 across a smooth direct current supply, (e. g., a battery, accumulator, or, as shown in Figure 1, an alternating current supply with a rectifying apparatus including a full wave rectifier 13, capacitors 14, 15, and resistors 16, 17, such as is normally employed in this type of equipment), the positive potential at 11, in the example given, being 180 volts. The provision of constant voltage to the various components is essential, and, if necessary, a voltage regulating means, such as a neon stabilizer 18, can be connected across the supply.

The pentode valve 19 is a known form of oscillator, which, by means of a quartz-crystal 20, and a capacitance potentiometer 21, 22, and a resistance potentiometer 23, 24 connected across its cathode and control grid to earth, initiates and maintains a constant alternating current supply of high stability in its anode circuit. The stability of this alternating voltage is due mainly to the capacitance potentiometer, the capacitor 21 being of small value whilst that of 22 is high. The resistor 23 is a normal grid leak, whilst the cathode bias resistor 24 is of moderately small value. The anode voltage is supplied through a resistor 25 while the screen grid voltage is applied through a resistor 26 and de-coupled by means of a capacitor 27. This combination can be demonstrated to maintain an extremely stable frequency of oscillation at the anode in spite of wide temperature variations and also with very great voltage fluctuations in the anode and screen grid supplies.

The oscillatory voltage, produced in the anode circuit of the valve 19, is available at any point between the anode and the anode resistor 25, whence either the actual fundamental frequency of the crystal 20, or some harmonic thereof, may be obtained. I reject the fundamental frequency and, instead, utilise one of the odd harmonics, such as the third or fifth—these being found to be more stable than the even harmonics such as the second or fourth. The oscillatory voltage is fed, through a variable capacitor 28, which reduces the potential variation to a small fraction of that available, to a tank circuit comprising an inductance 29 and a capacitor 30 which are parallel-tuned to the selected odd harmonic. This tank circuit improves the wave form, available at the anode of valve 19, from saw tooth to sinusoidal, and applies it to a secondary circuit comprising an inductance 31 and a capacitor 32 which are tuned to the same odd harmonic.

The output of this secondary circuit is injected into a pentode amplifier valve 33, which amplifies the small voltage and feeds it to the primary winding 34 of a parallel-tuned, filtering transformer, of which the secondary winding is shown at 35, and the associated capacitors at 36 and 37.

The tuned transformer 29, 31, being fed from valve 19 via the very small capacitor 28, only amplifies the voltage very slightly, and its purpose is to rather select the required harmonic than to amplify the voltage available. In consequence, temperature variations in the components will only effect extremely small variations in the frequency available at the grid of the valve 33.

With valve 33, however, the conditions are different since the full output available at the anode, and representing the exact frequency of the selected harmonic of the crystal, will be available in the tuned circuit 34, 36, whilst a considerably amplified value of the frequency voltage injected into valve 33 will be available at the terminals of circuit 35, 37. Therefore temperature variations, if permitted to affect the components of the combined circuit 34, 35, 36, 37, will affect both the inductance values and the capacitance values, and thus, the filtering value of this combination.

Thus, by selecting suitable components to cover the possible temperature range in which the instrument is intended to operate, the stability of the filter (34—37) can be improved, although such a selection cannot completely eliminate the effect of temperature changes.

With this end in view, the value of the inductance 34 is considerably greater than that of the inductance 35, with the consequence that a rise in temperature will effect a much greater increase in the inductance value of the former than of the latter, and since both the primary and secondary circuits require to be tuned to the same frequency value, it is evident that a much greater capacitance will be required to frequency-tune inductance 35 than 34.

The capacitor 38 is influenced by the stylus, indicated diagrammatically at S, for effecting the desired measurement or comparison of measurements—i. e., the stylus influences the capacitance by the relative displacement of the capacitor plates, the capacitor being arranged in a measuring head in the manner according to British patent specification No. 577,538. As the value of capacitance 38 is only a small percentage of the total value required to tune the secondary 35, 37 of the filter, ancillary capacitors 39, 40, 41, 42 and 43 are provided, and each of them is selectively switchable into the circuit, by a movable switch member 44, for giving the measuring head a variable degree of sensitivity. There is also provided compensating capacitors 45, 46, and 47.

The greater value of capacitance necessary in the secondary filter 35, 37 is adjusted to cause an equivalent discrimination, with a rise or fall in temperature, of the frequency induced by the primary filter 34, 36, changes in ambient temperature causing a minimum of frequency variation due to the high value of the capacitances in circuit and by reason of the negative and positive opposition of inductance and capacitance in parallel. Thus when a rise in temperature occurs, the coil 34 will increase in size and, therefore, in inductance, and a fall in frequency will be effected. However, the capacitor 36 will also be affected, and the capacitance value, due to an increase in temperature, will be reduced, causing a rise in frequency discrimination. The effect of temperature on the inductance and capacitance will, therefore, balance out and maintain a constant frequency filtering value. The secondary coil 35, having a much smaller inductance will have a larger capacitance value, but part of this will be outside the temperature control, being contained in the measuring head. The remainder, being positioned in a cooler portion of the instrument will be affected to a smaller degree than the primary (due to constructional considerations) and, therefore, will necessarily be of greater value to produce a similar balance of frequency control.

The measuring head, when in operation, is opened from a maximum capacitance value to one permitting a desired value of current to be induced into the secondary 35 from the primary filter, and any variation in the position of the stylus of the measuring head will cause the value of this current to increase, or decrease, according to the value of the capacitance 38 and the capacitance in the circuit 35, 37, the sensitivity of the detection being modified by the value of whichever of the capacitors 39 to 43 is selected. The valve 33 is provided with a cathode bias resistor 48 and a by-pass capacitor 49, the screen voltage being applied through a resistor 50 and de-coupled to earth by a capacitor 51.

In Figure 1 the variation in the induced voltage in filter 35, 37 is applied to a grid of the double triode valve 52, the cathodes and anodes of which are arranged in bridge circuit by means of potentiometers 53, 54, so as to operate as a valve voltmeter bridge balance.

In Figure 2 the induced voltage is fed to the cathode of one side of an inverted double diode valve 55, the anode being connected to one grid of the valve 51 and to earth by a resistor 56. Thus, the valve 55 acts as a half wave rectifier, the rectified voltage providing the negative bias for the grid. The other grid of the valve 52 is connected to a similar circuit, in which the other cathode of the valve 55 is connected to earth, and the anode is connected to the grid of the valve 52 and to earth by a resistor 57 to provide a very stable biassing voltage on the grid of the valve 52. The difference in voltage on the grids of the valve 52 causes a difference in anode current through the two halves, and consequently a difference in voltage drop across the two portions 58, 59 of the potentiometer 54. This voltage difference is indicated by a measuring device 60 which can be calibrated in linear dimensions of the order to be measured.

It is found that the following values are required for the various components used:

Capacitors:
- 14—16 mfd.
- 15—16 mfd.
- 21—100 mmfd.
- 22—1,000 mmfd.
- 27—0.01 mfd.
- 28—3–30 mmfd.
- 38—0–300 mmfd. (including leads)
- 39—250 mmfd.
- 40—200 mmfd.
- 41—150 mmfd.
- 42—100 mmfd.
- 43—50 mmfd.
- 45—50 mmfd.
- 46—50 mmfd.
- 47—10 mmfd.
- 49—0.01 mfd.
- 51—0.01 mfd.

Resistors:
- 16—1,500 ohms
- 17—1,500 ohms
- 23—680,000 ohms
- 24—10,000 ohms
- 25—22,000 ohms
- 26—100,000 ohms
- 48—300 ohms
- 50—100,000 ohms
- 53—10,000 ohms variable
- 54—9,400 ohms variable
- 56—220,000 ohms
- 57—100,000 ohms The neon stabilizer 18 is of the type VS150. The valve 13 is a 6X5, the valve 19 a 6J7, the valve 33 a 6K7, the valve 52 a 6SN7 and the valve 55 a 6H6.

What I claim as my invention and desire to secure by Letters Patent of the United States is:

1. Means for measuring the capacitance of a variable capacitor, including an oscillator valve the output at the anode of which is of constant frequency, a quartz-crystal for regulating said oscillator valve, a tank circuit combined with said oscillator valve for filtering out a selected harmonic, and an amplifying circuit to which the selected harmonic is fed and which includes a voltage amplifier and a temperature compensating filter, the latter comprising a primary section of small inductance and large capacitance, and a secondary section of smaller inductance and larger capacitance as compared with the primary section, the inductances and capacitances of the two sections respectively being arranged for any variations due to temperature changes to be opposed, and said secondary section including said variable capacitor.

2. A measuring means, according to claim 1, and including a valve voltmeter balance bridge to which the output of said temperature compensating filter is fed.

3. A measuring means, according to claim 1, and including a half wave rectifier to which the output of said temperature compensating filter is fed, and a valve voltmeter balance bridge having a grid provided with a biasing voltage by said rectifier.

JAMES RICHARD CORNELIUS.

REFERENCES CITED

The following references are of record in the file of this patent:

UNITED STATES PATENTS

| Number | Name | Date |
|---|---|---|
| 1,946,924 | Allen et al. | Feb. 13, 1934 |
| 2,200,863 | Schuck | May 14, 1940 |
| 2,222,221 | Burford | Nov. 19, 1940 |
| 2,387,496 | Cornelius | Oct. 23, 1945 |
| 2,510,822 | Jacot et al. | June 6, 1950 |